US012372057B1

(12) United States Patent
Guttromson et al.

(10) Patent No.: US 12,372,057 B1
(45) Date of Patent: Jul. 29, 2025

(54) WIND TURBINE MANAGEMENT SYSTEM FOR CONTROLLED ENERGY STORAGE

(71) Applicants: National Technology & Engineering Solutions of Sandia, LLC, Albuquerque, NM (US); Baylor University, Waco, TX (US)

(72) Inventors: Ross Guttromson, Albuquerque, NM (US); Ian Gravagne, Waco, TX (US)

(73) Assignees: National Technology & Engineering Solutions of Sandia, LLC, Albuquerque, NM (US); Baylor University, Waco, TX (US)

( * ) Notice: Subject to any disclaimer, the term of this patent is extended or adjusted under 35 U.S.C. 154(b) by 35 days.

(21) Appl. No.: 18/244,385

(22) Filed: Sep. 11, 2023

Related U.S. Application Data

(60) Provisional application No. 63/405,647, filed on Sep. 12, 2022.

(51) Int. Cl.
*F03D 7/02* (2006.01)
(52) U.S. Cl.
CPC ......... *F03D 7/0284* (2013.01); *F03D 7/0276* (2013.01); *F05B 2270/1033* (2013.01); *F05B 2270/327* (2013.01); *F05B 2270/337* (2013.01)
(58) Field of Classification Search
CPC ............... F03D 7/0284; F03D 7/0276; F05B 2270/1033; F05B 2270/327; F05B 2270/337
See application file for complete search history.

(56) References Cited

U.S. PATENT DOCUMENTS

| | | | | |
|---|---|---|---|---|
| 6,670,721 | B2 * | 12/2003 | Lof | H02J 3/48 290/44 |
| 8,415,817 | B2 * | 4/2013 | Thisted | H02J 3/38 290/44 |
| 10,389,126 | B2 * | 8/2019 | Kearns | H02J 3/241 |
| 10,740,775 | B2 * | 8/2020 | Hammerstrom | G05B 15/02 |
| 10,756,543 | B2 * | 8/2020 | Detmers | H02J 3/32 |
| 11,073,132 | B2 * | 7/2021 | Li | F03D 7/0272 |
| 11,468,460 | B2 * | 10/2022 | Hammerstrom | G06Q 50/06 |
| 11,680,558 | B2 * | 6/2023 | Howard | H02J 3/241 290/44 |
| 11,799,290 | B2 * | 10/2023 | Londono | H02J 3/241 |
| 11,892,809 | B2 * | 2/2024 | Kohn | G06N 20/00 |

(Continued)

OTHER PUBLICATIONS

Guttromson, R. et al., "Use of Wind Turbine Kinetic Energy to Supply Transmission Level Services," Sandia Report, SAND2018-772151 (2018) 38 pages.

(Continued)

*Primary Examiner* — Pedro J Cuevas
(74) *Attorney, Agent, or Firm* — Daniel J. Jenkins

(57) ABSTRACT

A system and method of managing a wind turbine, by receiving one or more characteristics from a first grid node from one or more grid sensors at a first time and receiving one or more characteristics from a second grid node from one or more grid sensors at a second time. The system and method also determine a power output requirement based on the one or more characteristics from the first grid node and the second grid node and regulate the operation of the wind turbine, based on the power output requirement by causing the blade rotational speed of the wind turbine to oscillate.

19 Claims, 6 Drawing Sheets

(56) References Cited

U.S. PATENT DOCUMENTS

| | | | |
|---|---|---|---|
| 2003/0011348 A1* | 1/2003 | Lof .......................... | H02J 3/48 |
| | | | 322/37 |
| 2008/0150285 A1* | 6/2008 | Corcelles Pereira ... | H02P 9/007 |
| | | | 322/23 |
| 2014/0070617 A1* | 3/2014 | Detmers ............... | H02J 7/0071 |
| | | | 307/64 |
| 2014/0074311 A1* | 3/2014 | Kearns ..................... | H02J 3/38 |
| | | | 700/297 |
| 2022/0082087 A1* | 3/2022 | Howard ................... | H02J 3/46 |
| 2022/0149627 A1* | 5/2022 | Londono ................. | H02J 3/381 |
| 2023/0041412 A1* | 2/2023 | Kohn ................ | G05B 13/0265 |

OTHER PUBLICATIONS

Gravagne, I. et al., "Use and Testing of a Wind Turbine for the Supply of Balancing Reserves and Wide-Area Grid Stability," Sandia Report, SAND2018-773084 (2018) 46 pages.

* cited by examiner

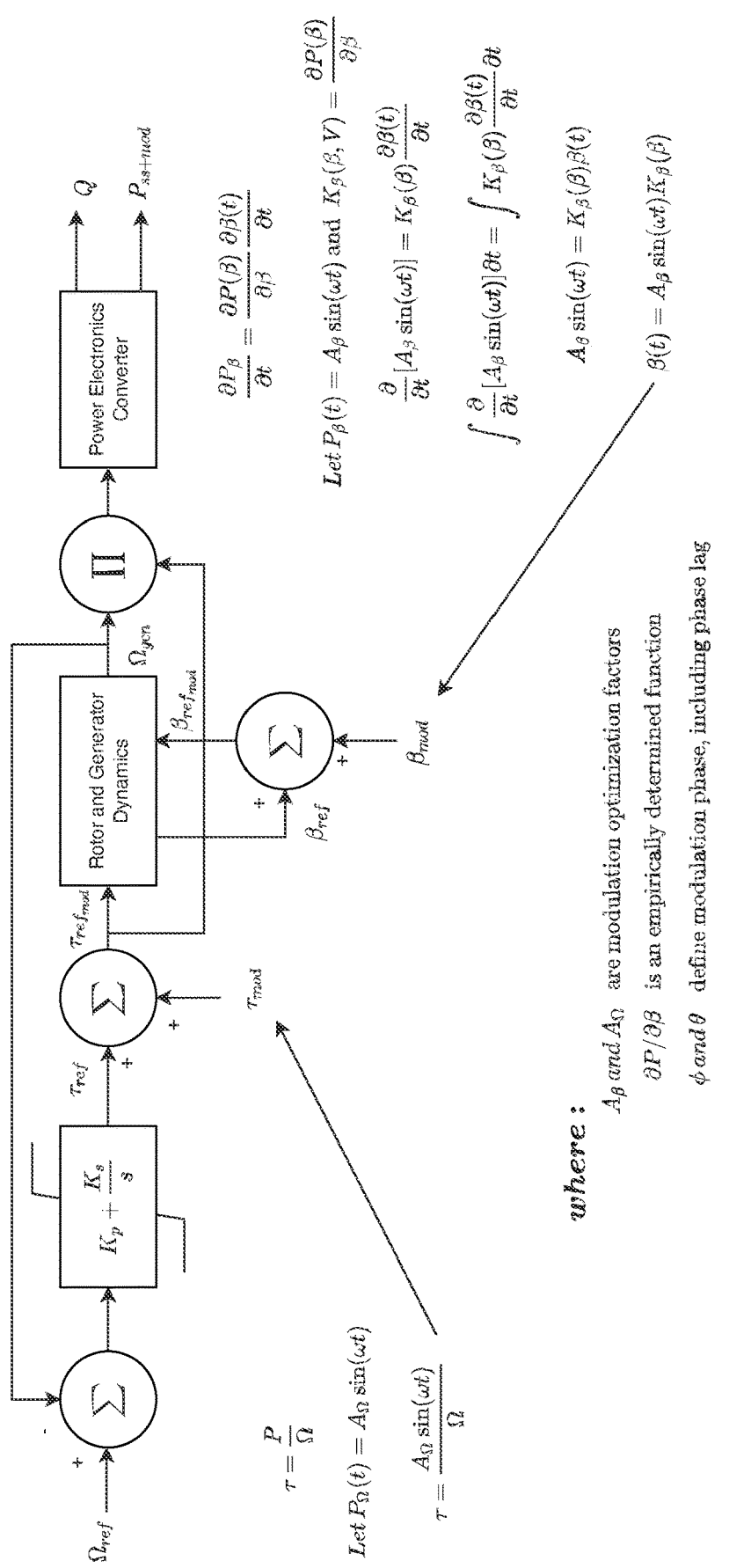
FIGURE 6    MODIFICATION TO WIND TURBINE BLOCK DIAGRAM

*Given*:

$[\beta_{min}, \beta_{max}]$ — Blade pitch limits $\omega_m$ — Modulation frequency $[\Omega_{min}, \Omega_{max}]$ — Rotor speed modulation limits $[P_{e_{min}}, P_{e_{max}}]$ — Inverter power limit $A_{mod}$ — Peak modulation amplitude $[\tau_{min}, \tau_{max}]$ — Rotor torque limit

*Decision Variables*: $A_\beta$ and $A_\Omega$ $Loss_\Omega$ is described in [1] equations 10-13, and Solution shown as Figure 3

$$Loss_\beta = \int_{\beta=\beta_2}^{\beta=\beta_1} \frac{\partial P}{\partial \beta} \partial \beta$$

$$\min\ (Loss_\Omega + Loss_\beta)$$

s.t.

$Loss_\Omega + Loss_\beta \leq Loss_{max}$ → Losses do not exceed a user specified value $A_\beta + A_\Omega = A_{mod}$ → Rotor and angle modulation are used together $\Omega \in [\Omega_{min}, \Omega_{max}]$ → Rotor speed is within limits $\beta \in [\beta_{min}, \beta_{max}]$ → Blade pitch is within limits $P_{mod} \in [P_{e_{min}}, P_{e_{max}}]$ → Power modulation is within inverter limits $\tau \in [\tau_{min}, \tau_{max}]$ → Turbine rotor torque is within limits

FIGURE 7    OPTIMIZATION FORMULATION

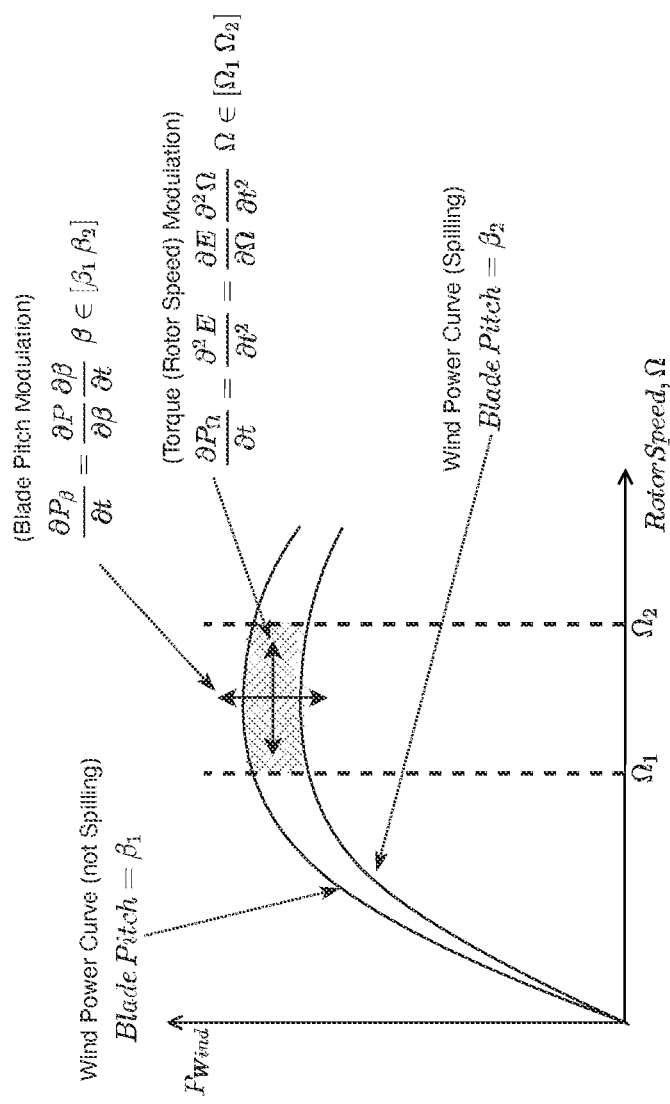
FIGURE 8   WIND POWER MODULATION

WIND TURBINE MANAGEMENT SYSTEM FOR CONTROLLED ENERGY STORAGE

CROSS-REFERENCE TO RELATED APPLICATIONS

This application claims priority to provisional patent application U.S. Ser. No. 63/405,647, entitled "WIND TURBINE MANAGEMENT SYSTEM FOR CONTROLLED ENERGY STORAGE," filed Sep. 12, 2022, the disclosure of which is incorporated herein by reference in its entirety.

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD

The present invention is directed toward the use of stored inertial energy within a wind turbine for the provision of ancillary grid services, and more particularly directed to the combined use of torque modulation (using stored inertial energy) and blade pitch modulation.

BACKGROUND

The addition of wind turbines into the US grid offers tremendous benefits to our environment and energy independence. Wind integration implies the displacement of synchronous generation and has resulted in a decline of several services that are inherent to synchronous generation, such as the ability to store and release energy from rotational kinetic energy.

Wind turbines can be thought of as two distinctly different resources which operate at the same rotational speed: a wind turbine and a flywheel storage device. The ability to access energy from a flywheel requires it to be sped up and slowed down, by using to controller to modify the rotational blade speed setpoint away from its optimal power delivery point. Doing this, however, reduces the efficiency of the wind power conversion process. But if this efficiency drop is less than the alternative of reducing (then increasing) turbine output power by changing blade pitch (spilling wind), it will make sense to modulate wind turbine output as flywheel resource, where possible. Another limitation is the power rating of the wind turbine. For example, the delivery of stored energy requires a modulation of power output-a temporary increase above that which is already being produced-which in some cases may exceed the rating of the power electronics or mechanical limits. This effect can be observed in FIG. 4.

Surprisingly, the amount of accessible stored energy in a late model wind turbine (per installed MW) is significantly higher than in a synchronous generator's inertia but requires the ability to continually change its rotor speed, which results in operation away from its maximum power point tracking set point. When operating ±5% from the maximum power tracking point, a wind turbine has about 6 times the accessible inertial storage than a synchronous generator with a reduction in efficiency of 0.12%. However, if efficiency is allowed to decrease to a value equivalent to battery energy storage (efficiency drop of about 10%), the wind turbine can offer 75 times the amount of storage offered by a synchronous generator.

However, using control systems to manage system stability and/or balance by the storing and release of rotational kinetic energy in wind turbines has not been performed and can provide many grid services, increasing grid flexibility and resilience. Accessing stored rotational kinetic energy can be accomplished through the modulation of the turbine torque control signal but can impose wear and tear on the turbine. Blade stress, torsional stress, and lifetime fatigue are expected to exhibit little long-term effect from providing grid services, however, more detailed research is needed. Wind turbines experience frequent changes in torque due to normal operation such as changing wind conditions, however, the long-term effects of additional stress from modulating the power output is unknown. The safe provision of these services implies the proper selection of an amplitude and frequency band with which to modulate the turbine, which in turn restricts the amount of a particular service that can be provided.

For a given wind velocity, a steady state change in a wind turbines power generation in response to service demand for a wind speed involves changing the blade angle (known as pitch) to alter the aerodynamic efficiency of the turbine. As such, when a wind turbine receives a request to decrease its power output, the turbine can change its blade pitch angle (beta) to be less efficient for the same wind speed. Increases in power output occur in the same way, but only if the turbine is operating below its optimal point. Changing the blade pitch angle to be less efficient is known as spilling wind. However, the rotating turbine also stores large amounts of rotational kinetic energy from inertia of the rotating blades, but it is not used for the purposes of system stability or balance. This energy can be harnessed to modulate the output power of the turbine and provide stability and balancing services.

Spilling wind using blade pitch control and the use of rotating kinetic energy of the blades using torque control are methods that can both be used to provide system stability and balancing services to the grid. Torque/inertial control is far more efficient than spilling wind but has limited capacity. Blade pitch control has far more capacity but is very inefficient. Thus, there is a need to optimally combine both methods to achieve the most efficient effect as the demand for the services changes over time. This requires the need to continuously co-optimize these controls.

Power into the grid can be modulated for the purpose of providing ancillary grid services (voltage stability, small signal stability, managing system balance, etc.) or transmission and generation system stability or both. To date, stability has been accomplished by other means, including FACTS, transmission buildout, synchronous generation and exciter controls, and many other costly methods. Balancing services have been largely managed by the synchronous generation fleet using synchronous inertia, regulation, and other methods. While torque control has been used to control the wind turbine electrical power output, resulting in a change in the rotational speed of the turbine blades, torque control has not been used as a control mechanism for wind turbine output power modulation or system stability.

What is needed are methods for extracting limited kinetic energy from rotating inertia of a wind turbine then restoring the kinetic energy to perform power modulation.

SUMMARY

The present disclosure is directed to methods and controls to modulate wind power output around its optimal setpoint by using torque (inertial) control to provide balancing, frequency and stability services to the grid or microgrid without a reduction in energy production. In an embodiment, the methods and controls can additionally use blade pitch modulation concurrently with torque control in furtherance of modulating wind power output.

In an embodiment, a wind turbine management or control system is used to control a wind turbine's operations including power modulation. Inertial energy stored within wind turbine blades can be increased (absorbing power from the grid) or decreased (releasing power to the grid) in order to actuate a variety of local and wide-area control functions. When the mechanical wind power is less (more) than the electrical output set by the torque controller, the power imbalance results in a kinetic energy loss (gain), from (into) the blades, resulting in lower (higher) rotational speed. The function of modulating power output to the grid is for the purpose of ancillary grid services (grid stability and managing system balance, transmission and generation system stability or both, etc.) When the wind turbine is used to provide transmission system balancing services, the wind turbine power output is modulated such that an increase in turbine electrical output power occurs when a decrease in system frequency occurs, thereby acting to increase system frequency. The use of wind turbine power modulation can also be used to increase small signal stability, using wide area, synchronized input signals. For the improvement of small signal stability, the modulation should occur at the mode seeking to be damped, phase aligned with the difference between a local and remote signal measurement of which the damping can be measured. The signal must also be adjusted to account for differences in communication phase delay, identified during implementation.

In an embodiment according to this disclosure, a controller is disclosed that controls power modulation by controlling torque (torque control) to change the electrical 1 power output of the wind turbine without a commensurate change in wind velocity, providing transient power outputs at zero net energy over durations of several seconds. This may be referred to as inertial or stored energy control. In another embodiment, power modulation is controlled by a combination of torque and blade pitch modulation, which optimally combines torque control and blade pitch control methods to achieve the most efficient effect as the demand for the services changes over time. This requires the need to continuously co-optimize these controls. The use of both types of control provides many different required services for the grid, including synthetic inertia, regulation (within an allowable frequency range), and a short-term power dump to prevent rotor over acceleration during line faults, maintaining transient stability.

According to another embodiment of the disclosure, a wind turbine management system is disclosed that includes a control unit including a processor, and a memory containing instructions, which when executed by the processor, cause the wind turbine management system to receive one or more characteristics from a first grid node from one or more sensors at a first time. The wind turbine management system additionally receives one or more characteristics from a second grid node from one or more sensors at a second time and regulates the operation of one or more wind turbines based on the one or more characteristics. A speed of rotation of the one or more wind turbines oscillates between a first blade rotational speed and a second blade rotational speed and the first blade rotational speed is less than the second blade rotational speed. This process changes the stored kinetic energy of the turbine blade which is transmitted into the electric grid as power modulation.

According to yet another embodiment of the disclosure, a wind turbine management system is disclosed that includes a processor and a memory containing instructions, which when executed by the processor, cause the wind turbine management system to determine operating parameters of a wind turbine in order to preserve a synchronous generator's transient stability. This is accomplished by dynamically adjusting the wind turbine's real and reactive electrical short-term power output requirement to stabilize the nearby rotating generator. The system uses torque control to control blade rotational speed between a first blade rotational speed setpoint and a second blade rotational speed setpoint based on the operating parameters and the first blade rotational speed is less than the second blade rotational speed.

According to yet another embodiment of the disclosure, a method of managing a wind turbine system is disclosed that modulates power output by modulating torque. The method may also include modulating blade pitch. The wind turbine system includes one or more wind turbines, one or more sensors coupled to an electrical grid and configured to measure at least one characteristic of the electrical grid, one or more sensors coupled to the one or more wind turbines and configured to measure at least one characteristic of the one or more wind turbines, and a wind turbine management system including a processor and a memory. The one or more characteristics of the grid may be an excessively low damped electro-mechanical mode of the grid. The at lease one characteristic of the one or more wind turbines may be the ability to modulate its electrical power output at frequencies at or below one hertz. The method includes the wind turbine management system receiving one or more characteristics from a first grid node from one or more grid sensors at a first time. The method also includes determining, by the wind turbine management system, a dynamic power output requirement based on the one or more characteristics from the first grid node and regulating, by the wind turbine management system, the operation of the one or more wind turbines, based on the power output requirement to modulate turbine electrical power output. The modulation of power output is controlled by oscillating the blade rotational speed of the one or more wind turbines.

Other features and advantages of the present invention will be apparent from the following more detailed description, taken in conjunction with the accompanying drawings that illustrate, by way of example, the principles of the invention.

BRIEF DESCRIPTION OF THE DRAWINGS

FIG. 6 is a simplified control block diagram which indicates how the modulation of wind turbine electrical output power is accomplished by changing a torque input command and a blade angle input command.

FIG. 7 is a mathematical formulation for the optimization of torque control and blade pitch control which provides the needed modulation power output while minimizing modulation losses.

FIG. 8 is a graphic which indicates allowable region of torque and blade pitch control within the Wind Power Curve. Equations indicate the changes in modulation power obtained for each.

Wherever possible, the same reference numbers will be used throughout the drawings to represent the same parts.

DETAILED DESCRIPTION

The present disclosure is directed to systems and methods of modulating the electrical output of a wind turbine that uses stored inertial energy within the wind turbine for the provision of ancillary grid services. The systems and methods combine torque modulation (using stored inertial energy) and blade pitch modulation to fulfill power modulation demand at the lowest modulation losses. It should be noted that torque modulation and inertial modulation are the same modulation process as torque modulation refers to torque being actuated by the controller while inertial modulation refers to the energy of the modulation coming from the blade inertia. For blade pitch modulation: the actuator is the blade pitch reference input, and the source of energy modulation is coming from changes in blade efficiency as the blade is pitched.

The use of blade pitch modulation is well understood and practiced in the industry. In this disclosure, the control of inertial stored energy by modulating torque is disclosed. In another embodiment, the combined use of torque control and blade pitch control is disclosed. As such, when a power modulation demand must be met, it can be done with either torque control, blade pitch control or both. Since torque control is typically the most energy efficient of the two, it will be selected first. Then as modulation demand increases, its efficiency wanes and it becomes more efficient to combine blade pitch control along with inertial control. Selecting the optimal balance between the two types of modulation is disclosed in the following paragraphs.

During wind turbine operations when the required amount of power modulation causes excessive losses, the blade pitch modulation can be optimally combined with torque modulation to increase modulation capacity while minimizing the combined modulation losses.

Embodiments of the present disclosure, for example, in comparison to concepts failing to include one or more of the features disclosed herein, include modulating the rotation of a wind turbine to store and retrieve rotational energy in response to a changing ancillary service need.

Figure 1:
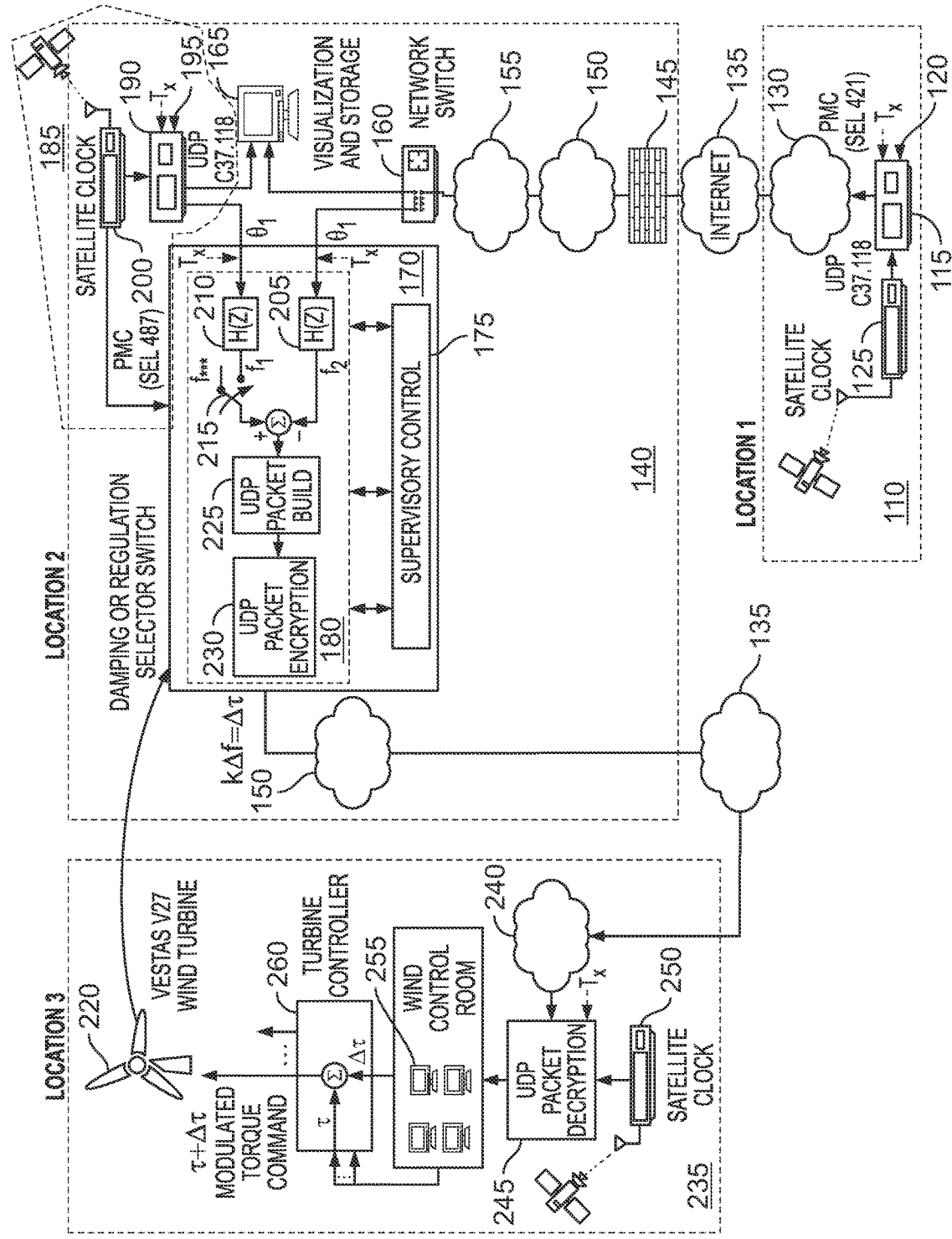
FIG. 1 is a schematic diagram of a wind turbine management system.

FIG. 1 illustrates a wind turbine management system according to an embodiment of the disclosure. In the example of FIG. 1, a first remote grid node sampling system 110 has a first phasor measurement unit 115. The first phasor measurement unit 115 includes a sensor, a processor and a memory, receives voltage and/or current data from a first grid node 120 of the electrical grid in conjunction with a synchronized time reference provided by a first satellite clock 125 at a first time. The first phasor measurement unit 115 determines a first synchrophasor which may include voltage, current, phase angle, and frequency, corresponding to the first grid node 120 data. Synchrophasors are time-synchronized numbers that represent both the magnitude and phase angle of the sine waves found in electricity and are time-synchronized.

The first phasor measurement unit 115 is in communication via a local network 130 and the internet 135 with a remote turbine management unit 140. The first synchrophasor data may be transferred to the remote turbine management unit 140 via various data protocols including User Datagram Protocol (UDP), or Transmission Control Protocol (TCP) over the Internet in combination with Internet Protocol (IP). In one embodiment, the data is transmitted using User Datagram Protocol (UDP). The data may optionally be encrypted for data security.

The remote turbine management unit 140 is in communication with the first phasor measurement unit 115 and configured to receive data (e.g., synchrophasor data) through a firewall 145 from the first phasor measurement unit 115. The data may be routed through a wide area network 150 and/or a local area network 155 and distributed via a network switch 160 to a visualization and storage system 165 including a processor, memory, which may further include database storage, input/output devices, and display devices. The visualization and storage system 165 may be further configured to further analyze the data and/or to further communicate the data with other systems.

The data may be routed via the network switch 160 to a remote wind turbine management system 170. The remote wind turbine management system 170 includes a supervisory control unit 175, which allows for automated and/or direct human review and control of a remote wind turbine management unit 180. The remote wind turbine management unit 180 receives data from the first phasor measurement unit 115 and a second remote grid node sampling system 185 having a second phasor measurement unit 190. The second phasor measurement unit 190 includes a sensor, a processor and a memory, and receives voltage and/or current data from a second grid node 195 of the electrical grid in conjunction with a synchronized time reference provided by a second satellite clock 200 at a second time. The second phasor measurement unit 190 determines a second synchrophasor corresponding to the second grid node 195 data. The first grid node 120 and the second grid node 195 are located at different geographic locations of the electrical grid. The first time and the second time may be substantially the same. In some embodiments, the difference between the first time and the second time may be less than about 10 milliseconds, less than about 7 milliseconds, less than about 5 milliseconds, less than about 3 milliseconds, less than about 2 milliseconds, and/or less than about 1 millisecond.

The remote wind turbine management unit 180 includes analysis units 205 and 210 which receive, time align, and analyze the data received from the first phasor measurement unit 115 and the second phasor measurement unit 190, respectively, to determine grid parameters. An operator monitoring the supervisory control unit 175 determines the position of a damping or regulator selector switch 215 based on the grid parameters. During a first mode of operation, the damping or regulator selector switch 215 is maintained in an open position. The wind turbine management unit 180 relies on the data from the first phasor measurement unit 115 to determine turbine parameters to regulate the operation of one or more wind turbines 220 of the system. The first mode of operation is used when the system requires load balancing during synchronous generation.

In addition to the generation of electricity, wind turbines 220 additionally store kinetic energy in their rotational components. The wind turbine 220 may include rotating components weighing many tons. As the wind turbine 220 rotates, it stores kinetic energy as represented by equation (1):

$$E = \frac{1}{2} J \Omega^2 \qquad (1)$$

wherein E is the rotational energy, J is the rotational inertia, and Ω is the angular velocity.

During steady state operation, the wind turbine 220 is typically operated at a maximum power tracking point, which establishes the blade rotational speed for maximum aerodynamic efficiency for a constant wind speed. The blade rotational speed of the wind turbine 220 rotation remains substantially constant over time, for a constant wind speed.

If the operator of the supervisory control unit 175 is attempting to increase system stability, the supervisory control unit 175 will operate the remote wind turbine management unit 180 in a second mode of operation with the damping or regulation selector switch 215 closed. The remote wind turbine management unit 180 determines the wind turbine 220 parameters using data from the first phasor measurement unit 115 and the second phasor measurement unit 190 by identifying the first synchrophasor and the second synchrophasor data packets having matching time stamps and comparing the synchrophasor data to identify differences between the geographically separated grid nodes 120 and 195. The remote wind turbine management unit 180 then determines a desired energy output for the wind turbine 220 and a corresponding modulation profile for wind turbine 220 operation, based on the data, to increase the grid stability.

The modulation profile regulates the blade rotational speed of the wind turbine 220 to controllably vary the amount of kinetic energy stored by the rotating wind turbine 220 to obtain the desired energy output as a function of time. In some embodiments, the wind turbine management unit 180 may determine the modulation profile using a mathematical model of the wind turbine 220. In some embodiments, the wind turbine management unit 180 may additionally receive the current operating parameters of the wind turbine 220 via wind turbine 220 sensors (e.g., force (torque), rotational speed, voltage, and/or current) over the internet 135. In some embodiments, the wind turbine management unit 180 may use both the current operating conditions and the mathematical model to determine the modulation profile. If the amount of kinetic energy of the wind turbine 220 is reduced, the energy is extracted and added to the electrical grid. If the amount of kinetic energy of the wind turbine 220 is increased, the energy is stored by the turbine as kinetic energy for later use.

The modulation profile is then prepared for transmission to the wind turbine 220 as an electronic data packet by packet build module 225. The packet may be configured to be transferred via various data protocols such User Datagram Protocol (UDP), or Transmission Control Protocol (TCP) over the Internet in combination with Internet Protocol (IP). In one embodiment, the packet is transferred via User Datagram Protocol (UDP). The electronic data packet may be encrypted by a packet encryption module 230 to increase data security during transfer.

The data packets may be transferred via network connection, such as the wide area network 150 and internet 135 to a local wind turbine control management unit 235. The data packets enter a wide area network 240 of the local turbine control management unit 235. A packet decryption unit 245 receives the data packets and decrypts the data. A third satellite clock 250 time stamps the reception which allows the local turbine control management unit 235 to synchronize the operating parameter of the wind turbine 220 with the desired energy output.

A local wind turbine control unit 235 having one or more data processing units 255 receives the decrypted data packets. The data processing units 255 include a processor and a memory. The data processing units 255 may also include input/output devices such as monitors and keyboards, which allow user monitoring and manipulation of the data.

The data packets are analyzed by the data processing units 255 which process the modulation profile to determine wind turbine 220 operating parameters, based on the operation status of the wind turbine 220, received modulation profile, and time stamp. The data processing units 255 determine a torque profile corresponding to the desired energy output of the wind turbine 220. The data processing units 255 may also provide a safety check on the modulation profile by determining whether the desired energy output results in stresses outside the mechanical limits of the wind turbine 220.

A torque control unit 260 (i.e., inertia controller) receives the torque profile and regulates the torque applied to the wind turbine 220 by adjusting power electronics firing angles to obtain the desired energy output. During steady state operation, the torque on the turbine via the turbine blades due to the wind is balanced by the torque generated between the rotor and stator of the wind turbine 220. As the power output of the wind turbine 220 is varied by the torque control unit 260, the torque applied to the turbine is correspondingly varied resulting in the acceleration/deceleration of the turbine as the turbine attempts to return to steady state operation. During this acceleration/deceleration, energy is transferred between the kinetic energy stored by the wind turbine 220 and the electrical energy output of the wind turbine 220. If the electrical energy output of the wind turbine 220 is greater than the mechanical energy input via the wind turbine 220 blades, the blade rotational speed decreases as kinetic energy is removed from the mechanical system and transferred to the electrical system. If the electrical energy output of the wind turbine 220 is less than the mechanical energy input via the wind turbine 220 blades, the blade rotational speed increases as kinetic energy is stored in the mechanical system. Suitable wind turbine systems are also described in Sandia Report (SAND2018-773084), (February 2018), "Use and Testing of a Wind Turbine for the Supply of Balancing Reserves and Wide-Area Grid Stability" and Sandia Report (SAND2018-772151), (February 2018), "Use of Wind Turbine Kinetic Energy to Supply Transmission Level Services" the contents of which are hereby incorporated by reference in their entirety.

Figure 2:
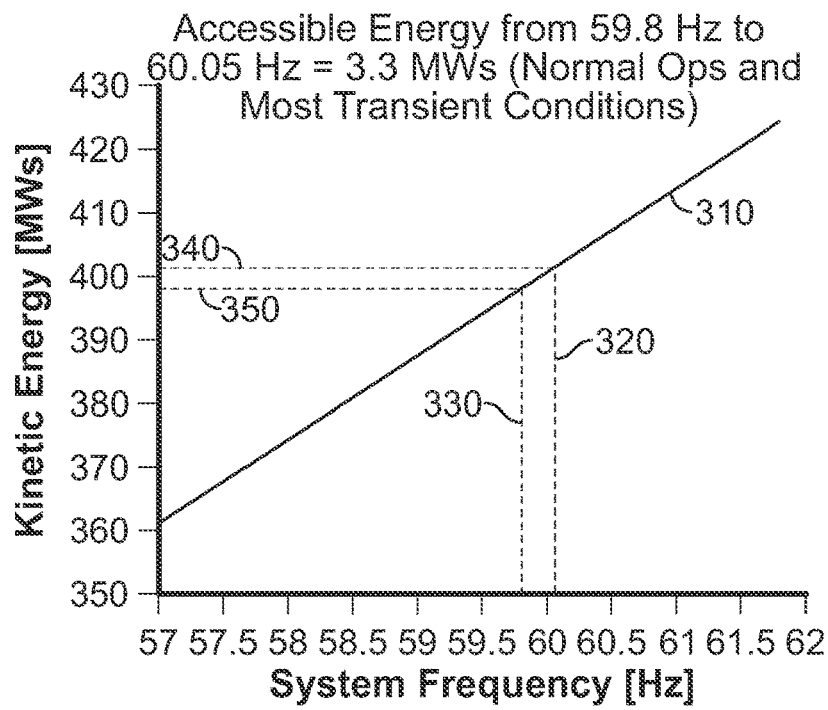
FIG. 2 is a graphical representation of the kinetic energy of a synchronous machine accessible energy within a predetermined range of generation frequencies.

FIG. 2 is a comparative example of the amount of kinetic energy accessible to a synchronous generator 300, while remaining within a predetermined range of generation frequencies. In the example of FIG. 2, the kinetic energy stored in a 100 MW synchronous machine is represented by the line 310. An upper system frequency 320 and lower system frequency 330 correspond to an upper kinetic energy 340 and the lower kinetic energy 350 of the synchronous machine. The difference between the upper kinetic energy 340 and the lower kinetic energy 350 is the amount of energy that can be accessed within the predetermined range of generation frequencies. The frequency of the output of a synchronous generator (hence the kinetic energy stored in the turbine) responds to changes in grid load imbalance. A typical range of frequencies suitable for the electrical grid is between about 59.8 hertz (Hz) and 60.05 hertz (Hz). About 3.3 megawatt seconds of kinetic energy is available over this frequency range.

Figure 3:
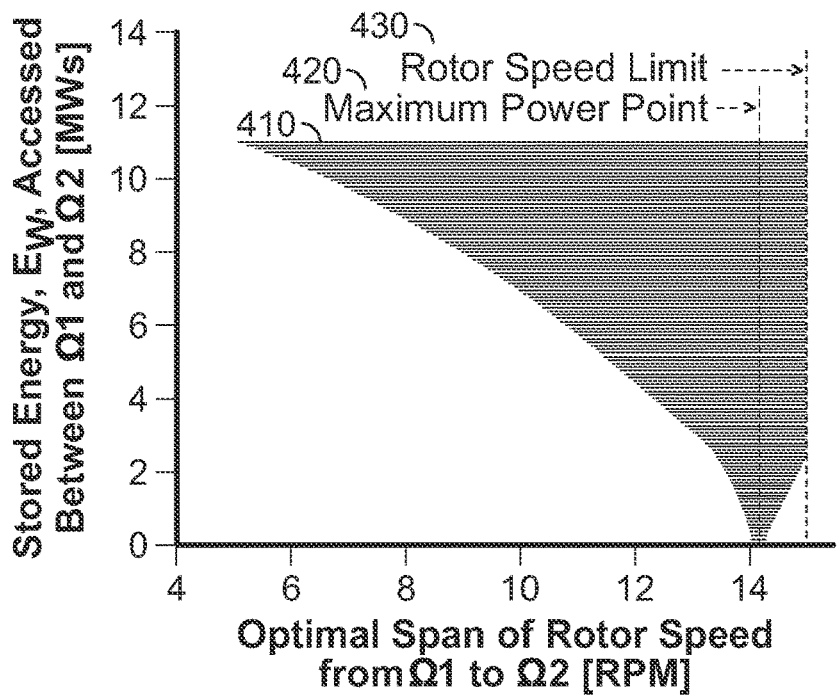
FIG. 3 is a graphical representation of the amount of kinetic energy that can be accessed from a wind turbine at their corresponding optimal blade rotational speed ranges.

The amount of kinetic energy 400 that can be accessed from the wind turbine 220 of FIG. 1 can be seen in in the example of FIG. 3. A wind turbine is a DC generator whose output passes through an invertor and is synchronized to the electrical grid. The frequency of the power output does not change as the kinetic energy stored in the wind turbine varies. This allows a larger portion of the kinetic energy of the turbine to be accessed. In the example of FIG. 3, over a variety of speed ranges 410, between $\Omega_1$ to $\Omega_2$ 410, kinetic energy is added to or subtracted from the wind turbine 220 of FIG. 1 by varying the blade rotational speed of the turbine blades. In some embodiments, the speed is varied around a maximum power tracking point 420. The amount of kinetic energy that can be added to wind turbine 220 is bounded by the maximum rotor speed limit 430 of the wind turbine 220 of FIG. 1.

As a comparison between the energy accessible from the synchronous generator of FIG. 2 and the wind turbine of FIG. 3 at rated parameters, if we select a wind turbine efficiency bound of 97.5 percent, about that of a typical generator, the ratio of accessible energy from 100MW of wind turbines to a 100MW synchronous generator of FIG. 2 is shown by equation (2), $$\frac{E_w^{\eta drop=2.5\%}}{E_{Synch\,Gen}^{f_{sys}\in[59.8\,Hz\,60.05\,Hz]}} = \frac{167\text{ MWs}}{3.34\text{ MWs}} = \text{Factor of }50. \tag{2}$$

In some embodiments, the modulation profile causes the amount of power delivered to the load as a result of the changing kinetic energy of the wind turbine 220 to be substantially constant over a predetermined period of time. In some embodiments, the controller causes the rotor speed of the wind turbine 220 of FIG. 1 to oscillate between a lower rotor speed $\Omega_1$ and an upper rotor speed $\Omega_2$, such as shown in FIG. 3. The wind turbine 220 of FIG. 1 lower rotor speed $\Omega_1$ is less than rotor speed of the maximum power tracking point 420 and the wind turbine 220 upper rotor speed $\Omega_2$ is greater than the rotor speed of the maximum power tracking point 420. In some embodiments, the lower rotor speed $\Omega_1$ and the upper rotor speed $\Omega_2$ are asymmetric around the maximum power tracking point 420. In some embodiments, the wind turbine 220 may oscillate between about 5 percent and about 100 percent of the rotor speed limit 430, between about 10 percent and about 99 percent of the rotor speed limit 430, between about 20 percent and about 98 percent of the rotor speed limit 430, between about 30 percent and about 95 percent of the rotor speed limit 430, between about 40 percent and about 93 percent of the rotor speed limit 430, between about 50 percent and about 90 percent of the rotor speed limit 430, and/or between about 80 percent and about 99 percent of the rotor speed limit 430.

Real power modulation frequencies may be selected within the mechanical limits of the wind turbine 220 of FIG. 1. Typical modulation frequencies are on the order of 0.01 hertz (Hz) to a few hertz. In some embodiments, the modulation frequency is between about 0.01 hertz and about 2 hertz (Hz), between about 0.1 hertz (Hz) and about 1 hertz (Hz), or between about 0.15 hertz (Hz) and 1 hertz (Hz).

Figure 4:
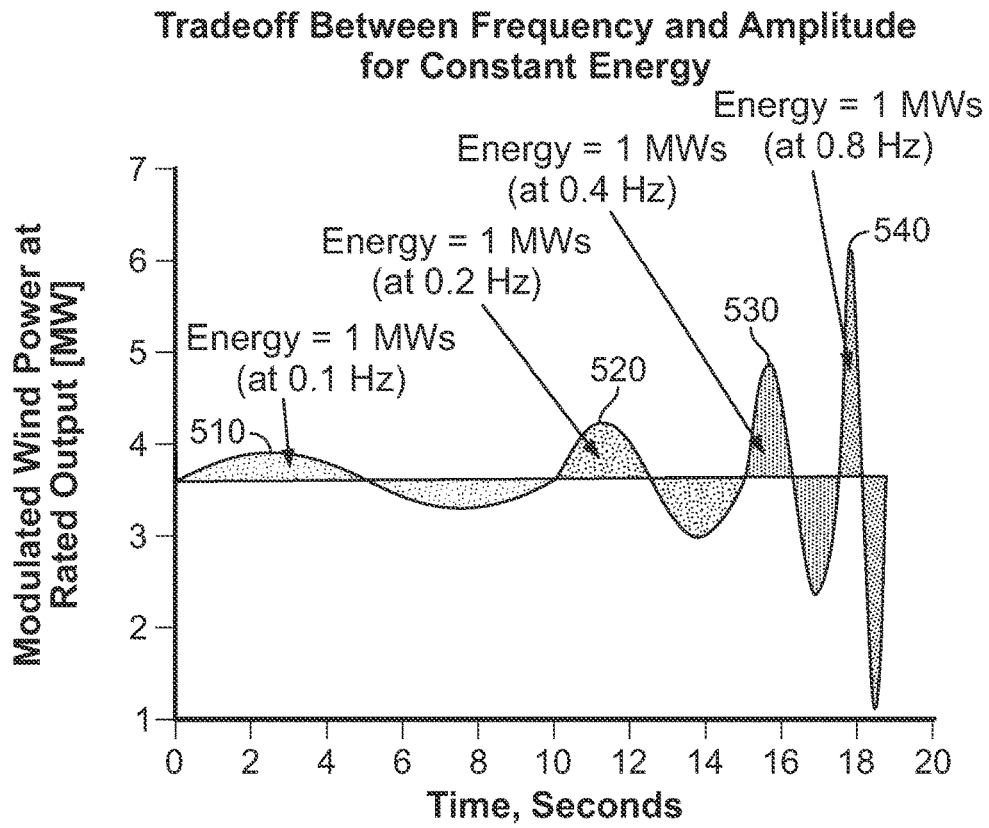
FIG. 4 is a graphical representation of a constant modulated energy at differing modulation frequencies.

FIG. 4 illustrates a constant modulated power at differing modulation frequencies 510, 520, 530, 540 in the wind turbine 220 of FIG. 1. The four sections of the curve illustrate the modulated output power of the turbine needed to extract 1 megawatt second of energy at frequencies of 0.1 hertz 510, 0.2 hertz 520, 0.4 hertz 530, and 0.8 hertz 540.

Figure 5:
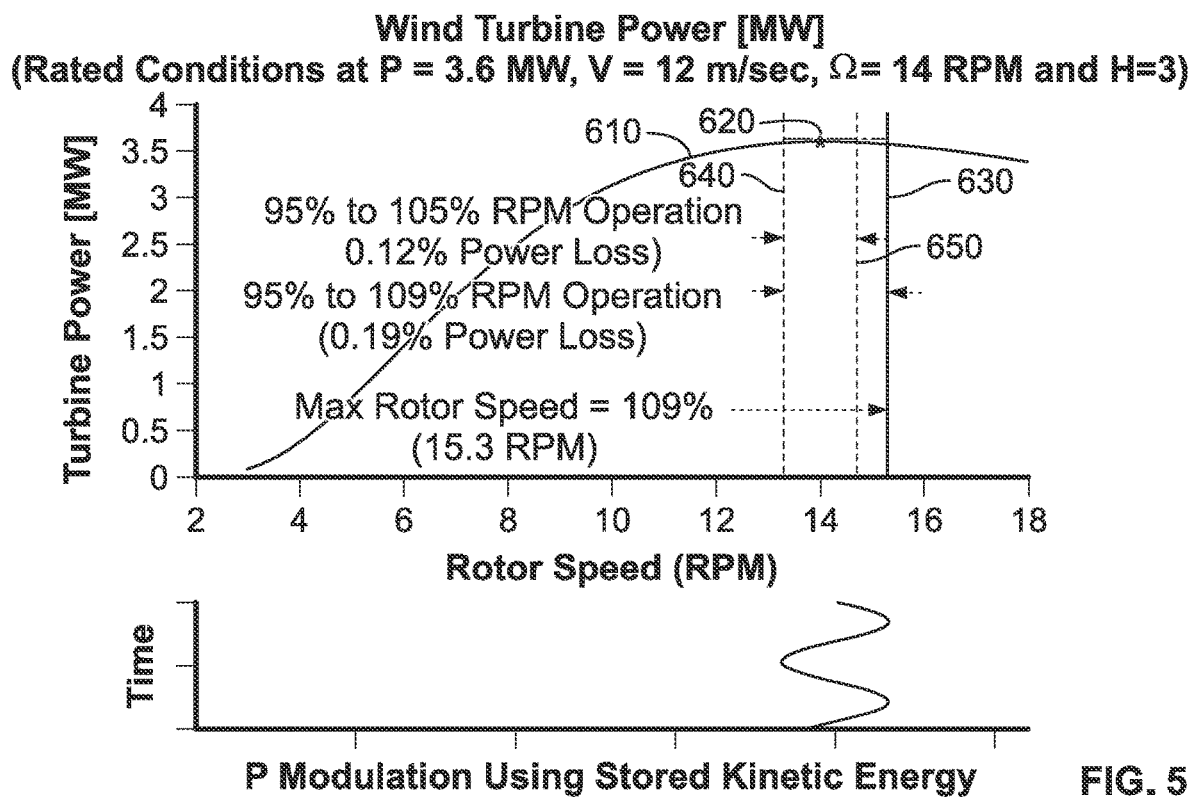
FIG. 5 is a graphical representation of the turbine power over a range of blade rotational speeds.

The modulation of the energy output of the wind turbine 220 of FIG. 1 results in a reduction of turbine efficiency as the operating parameters move away from the maximum power tracking point 420. FIG. 5 illustrates the turbine's modulation power and efficiency for ±5% optimal rotor speeds at rated conditions for the wind turbine 220 of FIG. 1. In the example of FIG. 5, the curve 610 is the turbine power at over a range of rotor speeds. The peak of the curve 610 is the maximum point tracking point 620, and rotor speed limit 630 is the mechanical limit of the rotors. The lower rotor speed 640 is 95 percent of the rotor speed of the maximum point tracking point 620. The upper rotor speed 650 is 105 percent of the rotor speed of the maximum point tracking point 620. The power loss over this range is 0.12 percent. If the upper rotor speed is increased to the rotor speed limit, the power loss is 0.19 percent. While the power and efficiency around the maximum power tracking point 620 is illustrated with the above example, the turbine could be operated between any two points on the curve 610 within the mechanical limits of the wind turbine 220 of FIG. 1.

The modulation of the power output of one or more turbines 220 may improve the stability of the electrical grid. As seen in the figures above, the energy that can be stored or extracted from a wind turbine 220 using inertial storage is limited by the total kinetic energy stored in the wind turbine 220 and the mechanical limits of the rotor of the wind turbine 220. The ability to modulate the magnitude of the power contributed to the electrical grid by a synchronized input allows various modes of instability to be addressed without disrupting the overall grid balance.

The following sections describe the combination of torque control (described above) with blade pitch control, which is commonly used by itself for slow changes to a wind turbine power output.

Pitch control is the ability to change the electrical power output of a wind turbine by changing the turbine blade pitch angle. Changing a rotor's blade pitch away from its optimal setpoint results in greater losses and lower electrical power output, however, the modulation of power provides an essential ancillary service. When performed in a cyclical and controlled manner, the modulation of power onto the grid can improve grid stability. Pitch control can be accomplished with the Controller 260, as a different embodiment from Torque control. Each separate control affects the power output of the wind turbine as shown in FIG. 8.

Combined Optimal Pitch and Torque Control: A combined optimal pitch and torque control method of modulating turbine output power using pitch control and torque control simultaneously to achieve desired modulation level, within constraints, is disclosed below.

FIG. 6 shows an embodiment of this control. The types of modulation can be explained in terms of control action by referencing FIG. 6. In FIG. 6:

Torque modulation only implies: $\tau_{mod}$ input is active, $\beta_{mod}$ input is zero.

Blade pitch modulation only implies: $\beta_{mod}$ input is active, $\tau_{mod}$ input is zero.

Combined Torque and blade pitch modulation implies: Both $\beta_{mod}$ and $\tau_{mod}$ inputs are active.

The benefits of combining these control methods gains additional modulation capacity than one method alone would provide. Combining them in an optimal manner ensures that the maximum efficiency will be attained at any level of modulation capacity chosen. As shown in FIG. 6, torque, τ, modulation is conducted simultaneously with pitch modulation. Torque modulation is achieved by modulating the torque reference input of the wind turbine controller in accordance with the equations shown. Pitch, β, modulation occurs by modulating the blade pitch reference input of the wind turbine controller in accordance with the equations shown. Varying the balances of the two types of control will affect the overall turbine efficiency, thus the amounts of control from each are defined by constants $A_β$ and $A_Ω$, which are optimally calculated to minimize loss.

The optimal combination of pitch and torque control methods to determine the amount of each control component (pitch control and torque control) which seeks to achieve the modulation requirements while minimizing total energy loss and is discussed below.

This optimization problem statement is formally described in FIG. 7. The problem statement has an objective function which minimizes the combined loss generated by pitch and torque modulation. The decision variables, those variables which should be changed in order to achieve the minimal loss are $A_β$ and $A_Ω$, the modulation amplitudes. The primary constraints essential for this formulation are listed in FIG. 7 and FIG. 6.

The amount of each type of modulation is given by variables $A_β$ and $A_Ω$, which are determined via the optimization formulation shown in FIG. 7 and the sources of each type of modulation power can be explained by FIG. 8. FIG. 8 shows two steady state wind velocity-power output (wind-power) curves for the same wind turbine operating at optimal blade pitch, beta1, and a lossy (less-than-optimal blade pitch), beta2. Operation of the wind turbine at any moment in time is represented by a single point on or below the curve beta1. The cross hatch indicates the region of operation where simultaneous and combined blade pitch modulation and torque modulation occur. Vertical component of movement in the cross-hatch region indicates torque modulation. Horizontal component of movement in the cross-hatch region indicates blade pitch modulation. Equations identifying the source of power for each type of modulation are indicated on FIG. 8.

While the invention has been described with reference to one or more embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A wind turbine management system connected to an electrical grid, the wind turbine management system comprising:
   a processor; and
   a memory containing instructions, which when executed by the processor, cause the wind turbine management system to execute instructions comprising:
      receive one or more characteristics from a first grid node from one or more sensors at a first time;
      receive one or more characteristics from a second grid node from one or more sensors at a second time; and
      input the one or more characteristics into a controller to regulate the operation of one or more wind turbines by modulating wind power output of the one or more wind turbines without a reduction in the wind power output using torque control;
   wherein a speed of rotation of the one or more wind turbines oscillates between a first blade rotational speed and a second blade rotational speed; and
   wherein the first blade rotational speed is less than the second blade rotational speed.

2. The system of claim 1, wherein a blade rotational speed of a maximum power tracking point is greater than the first blade rotational speed and less than the second blade rotational speed.

3. The system of claim 2, wherein the oscillation between the first blade rotational speed and the second blade rotational speed is asymmetric with respect to the maximum power tracking point.

4. The system of claim 1, wherein a frequency of modulation of the one or more wind turbines is between 0.01 hertz and 2 hertz.

5. The system of claim 1:
   wherein the receive one or more characteristics from the first grid node includes a first synchrophasor determined by the one or more characteristics from the first grid node at the first time; and
   wherein the receive one or more characteristics from the second grid node includes a second synchrophasor based on the one or more characteristics from the second grid node at the second time.

6. The system of claim 5, further comprising determining a power output requirement determined by the first synchrophasor and the second synchrophasor.

7. The system of claim 5, wherein regulating the operation of one or more wind turbines determined by the one or more characteristics includes regulating the operation of one or more wind turbines based on the first synchrophasor and the second synchrophasor.

8. The system of claim 1, wherein the oscillation of the speed of rotation includes a speed that is between 5 percent and 95 percent of a rated speed of the turbine.

9. The system of claim 1, further comprising determining a torque profile in real time.

10. The system of claim 1, wherein regulating the operation includes regulating the torque applied to a wind turbine shaft.

11. The system of claim 1, wherein the first time and the second time are substantially the same.

12. A wind turbine management system, comprising:
   a processor; and
   a memory containing instructions, which when executed by the processor, cause the wind turbine management system to:
      receive a power output requirement;
      determine operating parameters of a wind turbine using a wind turbine model and the power output requirement; and
      input the one or more characteristics into a controller to regulate the operation of a wind turbine by modulating wind power output of the one or more wind turbines without a reduction in the wind power output using torque control;
   wherein a blade rotational speed of the wind turbine oscillates between a first blade rotational speed and a second blade rotational speed determined by the operating parameters; and wherein the first blade rotational speed is less than the second blade rotational speed.

13. The system of claim 12, further comprising determine a torque profile determined by the energy output requirement.

14. The system of claim 13, wherein regulating the operation of the wind turbine includes applying a torque to a shaft of the wind turbine determined by the torque profile.

15. A method of managing a wind turbine system, the wind turbine system including one or more wind turbines, one or more sensors coupled to an electrical grid and configured to measure at least one characteristic of the electrical grid, one or more sensors coupled to the one or more wind turbines and configured to measure at least one characteristic of the one or more wind turbines, and a wind turbine management system including a processor and a memory, the method comprising:

receiving, by the wind turbine management system, one or more characteristics from a first grid node from one or more grid sensors at a first time;

determining, by the wind turbine management system, a power output requirement determined by the one or more characteristics from the first grid node; and regulating, by the wind turbine management system, the operation of the one or more wind turbines by modulating wind power output without a reduction in the wind power output using torque control, determined by the power output requirement;

wherein the regulating causes the blade rotational speed of the one or more wind turbines to oscillate.

16. The method of claim 15, wherein the regulating includes regulating a torque applied to a shaft of the one or more wind turbines.

17. The method of claim 15, wherein the blade rotational speed of the one or more wind turbines to oscillate between a first blade rotational speed and a second blade rotational speed, wherein the first blade rotational speed is less than the second blade rotational speed.

18. The method of claim 15, further comprising receiving, by the wind turbine management system, one or more characteristics from a second grid node from one or more grid sensors at a second time;

wherein the power output requirement is determined by the one or more characteristics from the first grid node and the one or more characteristics from the second grid node.

19. The method of claim 18, wherein the first time and the second time are less than about 10 milliseconds.

* * * * *